US010175115B2

(12) United States Patent
Bellanger et al.

(10) Patent No.: US 10,175,115 B2
(45) Date of Patent: Jan. 8, 2019

(54) WAVEFRONT SENSOR AND METHOD FOR DETERMINING DIFFERENCES IN PISTON AND TILT EXISTING BETWEEN SEVERAL LIGHT BEAMS

(71) Applicant: ONERA (OFFICE NATIONAL D'ETUDES ET DE RECHERCHES AEROSPATIALES), Palaiseau (FR)

(72) Inventors: Cindy Bellanger, Massy (FR); Maxime Deprez, Grougis (FR); Laurent Lombard, Paris (FR); Jerome Primot, Chatillon (FR)

(73) Assignee: ONERA (OFFICE NATIONAL D'ETUDES ET DE RECHERCHES AEROSPATIALES), Palaiseau (FR)

( * ) Notice: Subject to any disclaimer, the term of this patent is extended or adjusted under 35 U.S.C. 154(b) by 0 days.

(21) Appl. No.: 15/510,839

(22) PCT Filed: Sep. 18, 2015

(86) PCT No.: PCT/EP2015/071519
§ 371 (c)(1),
(2) Date: Mar. 13, 2017

(87) PCT Pub. No.: WO2016/042161
PCT Pub. Date: Mar. 24, 2016

(65) Prior Publication Data
US 2017/0276552 A1    Sep. 28, 2017

(30) Foreign Application Priority Data

Sep. 19, 2014    (FR) ...................................... 14 58876

(51) Int. Cl.
*G01B 11/02*    (2006.01)
*G01J 9/02*    (2006.01)
*G01J 9/00*    (2006.01)

(52) U.S. Cl.
CPC ............... *G01J 9/02* (2013.01); *G01J 9/0215* (2013.01); *G01J 2009/002* (2013.01)

(58) Field of Classification Search
CPC ...... G01J 9/02; G01J 9/0215; G01J 2009/002; G01B 9/02; G01B 11/2441; G01B 11/303; G01B 2290/30; G01M 11/005
(Continued)

(56) References Cited

U.S. PATENT DOCUMENTS 5,080,490 A * 1/1992 Manhart .............. G01B 11/255
356/492
7,106,457 B1    9/2006 Stahl et al.
(Continued)

FOREIGN PATENT DOCUMENTS

FR    2 930 336 A1    10/2009

OTHER PUBLICATIONS

International Search Report, dated Dec. 9, 2015, from corresponding PCT application.
(Continued)

*Primary Examiner* — Tarifur R Chowdhury
*Assistant Examiner* — Jonathon Cook
(74) *Attorney, Agent, or Firm* — Young & Thompson

(57) ABSTRACT

A wavefront analyzer is modified to simply determine the differences in amplitude and tilt which can exist between the different regions of an initial wavefront (S0). To achieve this, interference between two waves only is produced from beams (F1, F2) which come from neighboring regions on the initial wavefront. Such an analyzer can be used to coherently combine laser radiation produced by different sources arranged in parallel. Another use is for the determination of the differences in height and inclination which exist between the neighboring mirror segments of a Keck telescope.

20 Claims, 5 Drawing Sheets

(58) Field of Classification Search
USPC .............. 356/510, 499, 508, 513, 516, 521
See application file for complete search history.

(56) References Cited

U.S. PATENT DOCUMENTS 7,864,340 B2 * 1/2011 Primot .................. G01J 9/02
356/521
8,654,348 B2 2/2014 Primot et al.

OTHER PUBLICATIONS

C. Bellanger et al., "Collective phase measurement of an array of fiber lasers by quadriwave lateral shearing interferometry for coherent beam combining", Optics Letters, Dec. 1, 2010, pp. 3931-3933, vol. 35, No. 23.
Cindy Bellanger, "Design of a fiber-collimated array for beam combining", Optical Engineering, Feb. 1, 2011, p. 025005, vol. 50, No. 2.
Bruno Toulon et al., "Holistic characterization of complix transmittances generated by infrared sub-wavelength gratings", Optics Express, May 1, 2008, pp. 7060-7070, vol. 16, No. 10.
Jerome Primot et al., "Extended Hartmann Test Based on the Pseudoguiding Property of a Hartmann Mask Completed by a Phase Chessboard", Applied Optics, Nov. 1, 2000, p. 5715-5720, vol. 39, No. 31.
J. Primot et al., "Achromatic three-wave (or more) lateral shearing interferometer", Journal of the Optical Society of America, Dec. 1, 1995, pp. 2679-2685, vol. 12, No. 12.

\* cited by examiner

WAVEFRONT SENSOR AND METHOD FOR DETERMINING DIFFERENCES IN PISTON AND TILT EXISTING BETWEEN SEVERAL LIGHT BEAMS

The present invention relates to a wavefront sensor based on interference. It also relates to a method for determining differences in piston and tilt existing between several light beams capable of producing interferences.

In the present description, the expressions "wave surface" and "wavefront" are understood to be synonyms. Similarly, the terms "interference pattern" and "interferogram" are also used as synonyms. The term "tilt" is used to denote the inclination of a wavefront, and "piston difference" denotes the mean difference in advance that exists between two wavefronts, each wavefront advance being measured in its direction of propagation.

The thus-defined piston difference applies regardless of the spectral composition of the light radiation. For this reason, it can also be called absolute piston difference. However, for monochromatic light radiation, due to the spatial periodicity of the electromagnetic field, only a residual part of the piston difference is accessible during a static characterization, i.e. a characterization that is carried out at a single moment. This residual part is called residual piston difference and is equal to $[\text{Part\_Dec}(\Delta p/\lambda)]\cdot\lambda$, in which $\lambda$ denotes the wavelength of the monochromatic radiation, $\Delta p$ is the absolute piston difference and Part_Dec denotes the decimal part of the number that is contained between the parentheses. In particular, when monochromatic light beams having the same wavelength are combined together, only the residual piston differences that exist between the beams taken two-by-two are significant. But conversely, for pulses of light radiation or for polychromatic light radiation, only the absolute piston difference is of interest.

BACKGROUND OF THE INVENTION

Certain applications require precise determination of the differences in piston and tilt that exist between respective wavefronts of several light beams.

Such a need appears in particular during the adjustment of a mirror of a telescope of the Keck type. Such a mirror is constituted by a juxtaposition of separate mirror segments, each most frequently having a hexagonal peripheral limit. It is thus possible to form a complete mirror of approximately ten meters in diameter, with segments that individually measure approximately one meter in diameter. However, the mirror segments must be adjusted for height and inclination with respect to one another so that the wavefront of a light beam that is reflected by the complete mirror does not have steps or sudden variations in slope, which would be caused by differences in height and inclination present between neighbouring mirror segments.

The need also appears when the light beams from various laser sources are combined coherently in order to obtain a resulting high-intensity beam. The number of individual laser sources can be considerable when the light intensity desired in the combination beam is very high. In the case of monochromatic laser sources, the individual wavefronts of the beams which originate respectively from the laser sources, and which correspond to one and the same phase value, must be combined without phase errors. The thesis by B Toulon, defended on 20 Nov. 2009 at Université Paris XI Orsay and entitled "La mesure d'amplitudes complexes par interférométrie à décalage multi-latéral" [Measurement of complex amplitudes by multilateral shearing interferometry] proposes in particular a method based on quadrilateral shearing interferometry, for measuring differences in piston and tilt between 64 laser sources. In the case of pulsed laser sources, the combination of the individual pulses that are produced respectively by the laser sources, is not itself a pulse the duration of which is similar to that of the individual pulses, unless no significant delay exists for certain of the individual pulses with respect to others, and no differences between their directions of propagation. For these applications of coherent combination of monochromatic light beams or light pulses, a wavefront sensor based on interference is used, which comprises:

an optical input, intended to receive a light radiation having an initial wavefront that extends through said optical input;

a radiation splitter, arranged in order to produce, from light beams that originate respectively from restricted zones within the optical input, several sub-beams for each light beam, each sub-beam reproducing characteristics of the initial wavefront existing in the corresponding restricted zone;

optical paths, arranged in order to superimpose sub-beams that originate respectively from different restricted zones within the optical input, and which each pass via a different optical path;

at least one image detector, arranged in order to capture interference patterns that are produced by the superimposed sub-beams; and a processing module, suitable for determining, from the interference patterns, differences in piston and tilt that exist for the initial wavefront between the restricted zones from which the superimposed sub-beams originate.

The wavefront sensor is then used in order to characterize the overall wavefront that results from the individual wavefronts, produced separately by the laser sources.

In the device mentioned by B. Toulon, the radiation splitter is a diffraction grating that produces four replicas of the initial wavefront, corresponding to the combinations of two orders of diffraction, each equal to +1 or −1. The radiation splitter thus produces four sub-beams from each light beam. The restricted zones within the optical input correspond to the sections of the individual light beams that originate from the juxtaposed laser sources. These are equipped with output microlenses, so that the individual beams each have a parallel, or collimated, beam structure. The image detector then captures a combination of four-beam interferograms, from which the differences in piston and tilt that exist between two laser sources that are neighbouring within the optical input can be determined. Depending on the orientation of the diffraction grating with respect to the squared pattern of the distribution of the laser sources in the optical input, two different interference modes are obtained. But in these two modes, the interferograms all have a complex structure, with overlapping zones of different categories. For this reason, the determination of differences in piston and tilt from any one of the interferograms is a difficult task.

The article by C. Bellanger et al., entitled "Collective phase measurement of an array of fiber lasers by quadriwave lateral shearing interferometry for coherent beam combining", Optics Letters, 1 Dec. 2010, vol. 35, No. 23, pp 3931-3933, relates to a quadriwave lateral shearing interferometer of the same type.

SUMMARY OF THE INVENTION

Based on this situation, a purpose of the present invention is to allow simpler determination of differences in piston and tilt that exist between individual wavefronts of light beams that are capable of producing interferences.

To this end, a first aspect of the invention proposes a wavefront sensor such as described above, but which also comprises a mask suitable for selecting, by means of openings in this mask, separate zones of interest within the optical input as restricted zones, at least partially blocking the initial wavefront outside these zones of interest, or at least partially blocking light beams that do not originate from the zones of interest. The zones of interest can thus be determined by the openings in the mask, either directly if the mask is situated close to the optical input of the wavefront sensor, or by optical conjugation via components of the sensor. By means of such a mask, separate portions of the image detector are dedicated respectively to pairs of zones of interest that are neighbouring within the optical input, regardless of the extension of the initial wavefront and of the light intensity between the two neighbouring zones of interest. Each interferogram then only comprises interference patterns with two beams, within a portion of the image detector that can be separated from those of the other interferograms. The determination of the piston and tilt differences from these interference patterns with two beams is simple, and can be carried out easily and rapidly. In particular, it is not necessary to calculate Fourier transforms of the interferograms.

In preferred embodiments of the invention, the radiation splitter can comprise a diffraction grating. In fact, when two sub-beams are produced by a diffraction grating for different orders of diffraction, the photons in each sub-beam operating in a pulsed illumination regime are contained in a spatial segment of propagation progression, which is parallel to the diffraction grating. For one and the same illumination pulse, the spatial segments of all the sub-beams are then aligned with one another, parallel to the diffraction grating. An overlap zone in which interference between two of the sub-beams takes place can then be larger. The resulting accuracy can be greater, for the values of the differences in piston and tilt that are deduced from the interference patterns.

More particularly, the wavefront sensor can be arranged so that the sub-beams that are produced for each beam by the diffraction grating correspond to the values +1 and −1 for one or more diffraction order numbers. The mask then blocks the sub-beams that originate from the zones of interest with values that are zero for all the diffraction order numbers.

Advantageously, the mask and the image detector can be optically conjugated. In this case, the separate portions of the image detector in which the interferences are produced, correspond to pairs of openings of the mask. The images of the two openings of one and the same pair are superimposed on one another on the image detector by the radiation splitter.

According to an improvement of the invention, the wavefront sensor may also comprise an afocal optical system that is arranged on a radiation path between the optical input and the image detector, so as to transform the initial wavefront, with respect to the interference patterns that are captured by the image detector, by an homothetic spatial scaling effective within the optical input. The choice of magnification of the afocal system then makes it possible to adjust separately the sensitivity to the tilt difference between neighbouring zones of interest, with respect to the sensitivity of the piston difference.

In simple embodiments of the invention, the optical input, the mask, the afocal optical system, the radiation splitter and the image detector may be arranged in this order by following a direction of propagation of the radiation within the wavefront sensor. In this case, the mask and the image detector can be optically conjugated by the afocal optical system through the radiation splitter. Such an embodiment is particularly simple and brings together all the advantages mentioned.

For example, the mask may be suitable for selecting the zones of interest according to a hexagonal network distributing these zones of interest within the optical input. Then, the diffraction grating that forms the radiation splitter is two-dimensional with a hexagonal pattern, and is oriented so that axes of symmetry of the diffraction grating are at 90° to axes of symmetry of the mask, about an optical axis of the wavefront sensor. Such a hexagonal configuration is adapted to the shape of the mirror segments of a telescope of the Keck type, as well as to a compact arrangement of fibre laser sources.

Preferably, the mask may be such that any two neighbouring zones of interest have one same shape and one same size, and are separated by a blocking zone of the mask that is situated between these two neighbouring zones of interest, and this blocking zone is large enough to contain a shape that is identical to that of each of the two neighbouring zones of interest, and that is the same size as these latter. Then the surface portion of the detector in which the interference pattern is formed that corresponds to the two zones of interest is surrounded by a circle of zero illumination. In other words, the portions of the surface of the detector that are occupied by the interferograms are separated from one another, without overlaps, which facilitates automatic detection and analysis of each interferogram in the whole image that is captured by the detector.

Thanks to the invention, the determination of the differences in piston and tilt is simple, and can be carried out rapidly and cost-effectively. For example, the processing module can comprise a library of stored reference patterns, which are each constituted by parallel rectilinear interference fringes, each reference pattern being associated with a value for the piston difference and a value for the tilt difference. The values for the difference in piston and tilt that exist between two neighbouring zones of interest are then deduced by searching for a maximum coincidence between the interference pattern corresponding to these two zones of interest, and one of the stored reference patterns. Such a search for maximum coincidence may comprise applying an illumination or light intensity scale correction to the interference pattern and/or to each reference pattern. A coincidence score is then evaluated and compared to the score values that are obtained for the same interference pattern, but comparing it to other reference patterns from the library.

Generally, the processing module may be suitable for deducing a value for the piston difference that exists between two neighbouring zones of interest, from a transverse fringe shift that exists in the interference pattern corresponding to these two zones of interest. Moreover, the value of the difference in tilt that exists between the two zones of interest can be deduced from an interfringe spacing that exists in the interference pattern.

Furthermore, a wavefront sensor according to the invention may also comprise a spectral separation system that is suitable for separating from one another at least two spectral components of the light radiation received by the optical input. The wavefront sensor is then suitable for capturing separately for each spectral component, the interference patterns that are produced by the superimposed sub-beams, and for determining the differences in piston and tilt for each spectral component from interference patterns that have been captured for this spectral component. For example, the spectral separation system may be of the spatial separation type, for directing the spectral components to respective, separate optical paths of the wavefront sensor. Alternatively, the spectral separation system may have variable time-shift as a function of the wavelength, and the interference patterns that are formed by the different spectral components are captured at different moments.

Finally, the mask and the radiation splitter of a wavefront sensor according to the invention may be formed together by a spatial light modulator. Such an embodiment is advantageous due to its simplicity and its ability to be adapted to demand. It is in particular especially suitable when the radiation splitter comprises a diffraction grating.

A second aspect of the invention proposes to use a wavefront sensor according to the first aspect, in order to determine differences in piston and tilt that exist between the individual wavefronts of light beams capable of producing interferences. To this end, a method of the invention comprises:
supplying the wavefront sensor based on interference;
directing each light beam onto a different zone of interest, using zones of interest that are neighbouring in the optical input of the wavefront sensor; and
activating the image detector and the processing module in order to determine the differences in piston and tilt that exist between the individual wavefronts the light beams of which were directed onto neighbouring zones of interest.

Thanks to the invention, the differences in piston and tilt that exist between the light beams can be determined without using any additional reference wave. The method is thus simple to implement for this reason, without the need for optical components that are dedicated to the generation and the introduction of such a reference wave.

Such a method can be used in order to adjust the segments of a mirror of a telescope of the Keck type. In this case, the light beams are produced by a radiation source that is arranged so that the radiation is reflected simultaneously by the juxtaposed segments of the mirror. For each segment of the mirror, a part of the radiation that is reflected by this segment then forms the light beam that is directed onto one of the zones of interest of the optical input. For this application, the method also comprises calculating height differences and inclination differences that exist between two neighbouring segments of the mirror. These height and inclination differences are calculated from values for the differences in piston and tilt that are determined for the corresponding light beams.

A method according to the second aspect of the invention can also be used for phase adjustment of the light beams that are produced respectively by separate laser sources, in particular fibre laser sources. When the laser sources are of pulsed laser type, the radiation splitter advantageously comprises a diffraction grating. For this other application, the method also comprises calculating time differences and direction of propagation differences that exist between pulses of radiation produced by two different laser sources, the beams of which were directed onto two neighbouring zones of interest. These differences in time and direction of propagation are calculated from values for the differences in piston and tilt that are determined for the beams.

BRIEF DESCRIPTION OF THE DRAWINGS

Other features and advantages of the present invention will become apparent in the following description of non-limitative embodiments, with reference to the attached drawings, in which.

DETAILED DESCRIPTION OF THE PREFERRED EMBODIMENTS

In the interests of clarity, the dimensions of the different elements represented in the figures do not correspond either to actual dimensions or to actual dimensional relationships. Moreover, identical references that are given in different figures denote identical elements, or those having identical functions.

Figure 1:
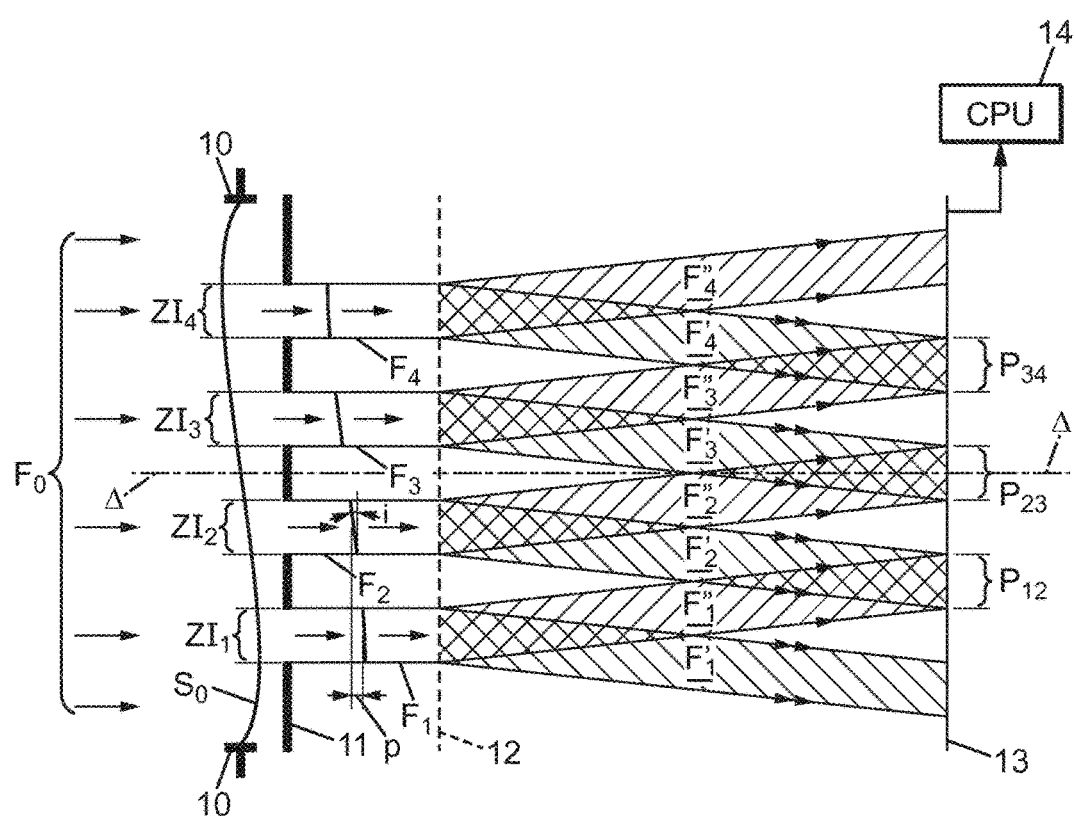
FIG. 1 is a schematic diagram in a single spatial dimension, which shows the function of a mask introduced by the present invention.

The references used in FIG. 1 have the following meanings:
Δ optical axis of the wavefront sensor
10 optical input of the wavefront sensor
11 mask with separate openings
12 diffraction grating
13 surface of an image detector
14 processing module, marked CPU
$F_0$ initial light beam
$F_1, \ldots, F_4$ selected beams within the initial beam $F_0$
$F'_1, F''_1$ sub-beams originating from the beam $F_1$
$F'_2, F''_2$ sub-beams originating from the beam $F_2$
$F'_3, F''_3$ sub-beams originating from the beam $F_3$
$F'_4, F''_3$ sub-beams originating from the beam $F_2$
$S_0$ initial wavefront
$ZI_1, \ldots, ZI_4$ zones of interest
$P_{12}, P_{23}, P_{34}$ portions of the surface of the image detector
p piston existing in a zone of the initial wavefront $S_0$
i tilt existing in a zone of the initial wavefront $S_0$ The optical input 10, the mask 11, the diffraction grating 12 and the image detector 13 are arranged perpendicularly to the optical axis Δ. The mask 11 is arranged in the optical input 10, or behind the latter along the optical axis Δ. The openings in the mask 11, which are separated from one another, determine a plurality of zones in the optical input 10, called zones of interest and marked $ZI_1, \ldots, ZI_4$. Firstly, it can be assumed that the initial beam $F_0$ is monochromatic and propagates substantially parallel to the optical axis Δ. Its initial wavefront $S_0$ through the optical input 10 can have substantially any shape, with variations in piston parallel to the optical axis Δ, and variations in tilt with respect to a plane that is perpendicular to the optical axis Δ. The openings of the mask 11 thus only allow separated beams $F_1, \ldots, F_4$, that originate from the initial beam $F_0$, to pass. The beams $F_1, \ldots, F_4$ reproduce portions of the wavefront $S_0$, such as those contained respectively in the openings of the mask 11.

In the simple case with a single dimension in FIG. 1, the diffraction grating 12 produces from each of the beams $F_1, \ldots, F_4$, two sub-beams that diffract symmetrically, and that correspond respectively to the values +1 and −1 of a diffraction order number. In FIG. 1, the sub-beams that are hatched in a direction correspond to the diffraction order +1, and those hatched in the other direction correspond to the diffraction order −1. According to the invention, the surface of the image detector 13, simply called image detector 13 hereinafter, is situated so as to receive in the same portions thereof, both a sub-beam of diffraction order +1 and another sub-beam of diffraction order −1, that originate from two beams determined by neighbouring openings of the mask 11. Thus, the portion $P_{12}$ of the image detector 13 receives the superimposed sub-beams $F''_1$ et $F'_2$. Similarly, the portion of detector $P_{23}$ receives the superimposed sub-beams $F''_2$ and $F'_3$, and the portion $P_{34}$ receives the sub-beams $F''_3$ and $F'_4$. The mask 11 prevents the detector portions $P_{12}$, $P_{23}$ and $P_{34}$ from receiving the parts of the initial beam $F_0$ that are intermediate between the zones of interest $ZI_1$ and $ZI_2$, $ZI_2$ and $ZI_3$, $ZI_3$ and $ZI_4$. The orders of diffraction greater than +1 or less than −1 can be disregarded. In practice, the light intensities of these orders can be significantly reduced or cancelled by choosing a suitable element configuration for the diffraction grating 12. In each of the portions of the detector 13, the two sub-beams that are superimposed produce an interference pattern. By comparing each portion of the initial wavefront $S_0$ that is contained in one of the zones of interest $ZI_1$, . . . , $ZI_4$ to a possibly offset and possibly inclined, plane portion along the optical axis Δ, then the interference pattern in each detector portion $P_{12}$, $P_{23}$, $P_{34}$ is constituted by parallel fringes. Now, for an initial beam $F_0$ that is monochromatic and when the difference in tilt is zero for one of these interference patterns, the phase shift of the central fringe with respect to the optical axes of the sub-beams is equal to $\Delta p \cdot F/\lambda$ where $\lambda$ is the is the wavelength, $\Delta p$ is the absolute piston difference that exists between the portions of the initial wavefront $S_0$ from which the two sub-beams that produce the interference in the detector portion in question originate, and F is the interfringe spacing of the interference pattern. But in practice, only the residual piston difference can be measured due to the monochromatic nature of the initial beam $F_0$.

For the two sub-beams that produce the interference pattern in one of the detector portions $P_{12}$, $P_{23}$, $P_{34}$, the tilt difference Δi is the angle at the apex of the prism that is formed by the planes tangent to the two portions of the initial wavefront $S_0$ that are contained in the zones of interest in question. This tilt difference Δi is then combined with the inclination difference of the sub-beams that form the interference in the portion of the detector. This angular combination is only simple when the direction of the apex of the prism of the tilt difference is perpendicular to the plane that contains the directions of propagation of the two sub-beams. The combination is then an addition of angles, and the variation in the spatial frequency of the interference fringes, measured according to the trace on the surface of the detector, of the plane that contains the directions of propagation of the sub-beams, is then equal to the tilt difference Δi divided by the wavelength. In the case of any orientation of the direction of the apex of the prism of the tilt difference with respect to the plane of the directions of propagation of the two sub-beams, a person skilled in the art will use the mathematical formulae given in the aforementioned thesis by B Toulon. Thus, the differences in tilt and their orientations can be deduced from the interference patterns of two waves that are captured by the image detector. The interference patterns as a whole also provide a redundancy that can be used in order to increase the accuracy with which the differences in piston, the differences in tilt and the orientations of the differences in tilt are determined.

Figure 2B:
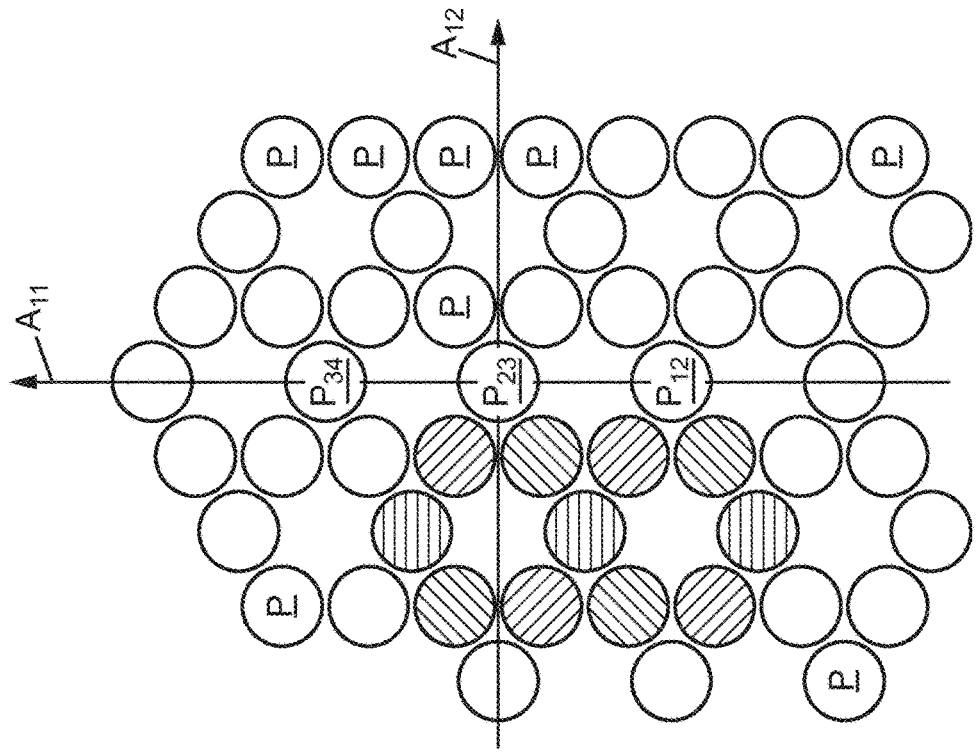
FIGS. 2a and 2b represent respectively a mask and a corresponding image as produced by a wavefront sensor according to the invention.
Figure 2A:
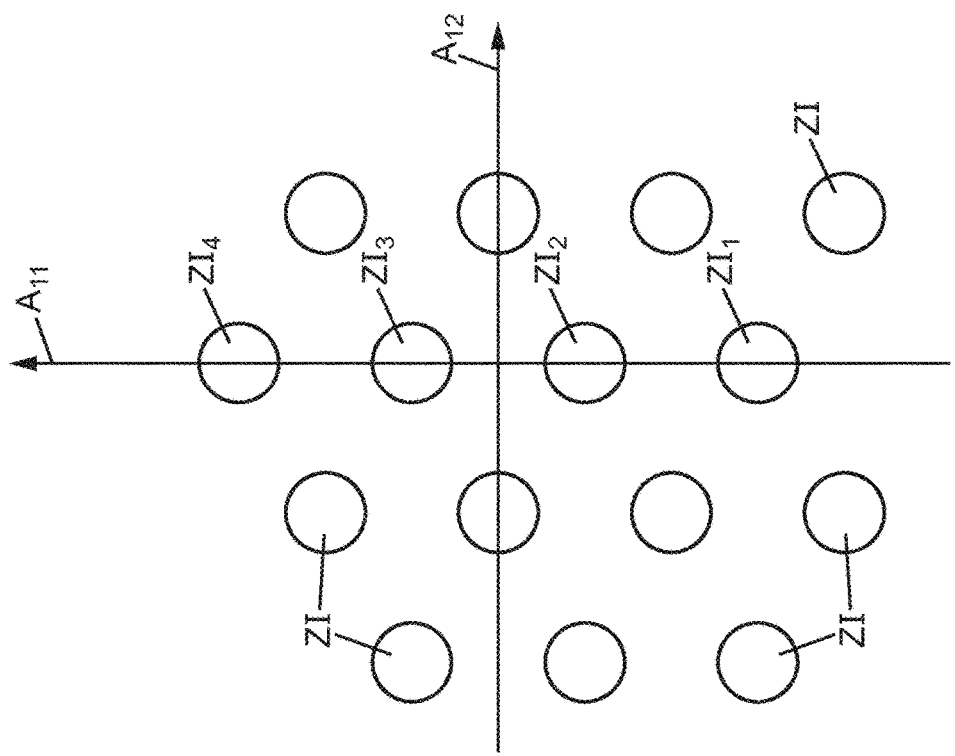

FIGS. 2a and 2b show an implementation in two dimensions of the operation of the invention that has just been described. FIG. 2a is a front view of the mask 11, with the zones of interest other than $Z_1$, . . . , $Z_4$, which are marked generically ZI. The zones of interest ZI are thus determined by openings arranged in an opaque plate which forms the mask 11. When the mask 11 is situated in the optical input 10, the zones of interest are merged with the openings of the mask. Two neighbouring zones of interest ZI are separated from one another by an intermediate segment of the mask that is opaque. This intermediate segment has a width that is at least equal to the size of each of the two neighbouring zones of interest. Preferably, the zones of interest ZI are distributed in a regular hexagonal network, in which $A_{11}$ is one of the axes of symmetry, or principal axes of alignment of the zones of interest in the symmetry of order six of the mask 11. The zones of interest ZI can be circular, with a zone size that is sufficient for the light diffraction that is produced by these zones of interest to be negligible. For example, the zones of interest ZI can each have a diameter of 50 μm (micrometer), and geometrical centres of two neighbouring zones of interest can be 110 μm apart. In this case, the diffraction grating 12 is also a regular hexagon, but with one of its axes of symmetry $A_{12}$ perpendicular to the axis $A_{11}$, when the two axes $A_{11}$ and $A_{12}$ are projected in one and the same plane perpendicular to the optical axis Δ.

FIG. 2b shows the complete image that is captured by the detector 13 for the mask 11 in FIG. 2a, with the portions of the surface of the detector that are dedicated separately to the pairs of neighbouring zones of interest ZI. These portions of the surface of the detector 13 are generically denoted P, in addition to the portions $P_{12}$, $P_{23}$ and $P_{34}$ that were presented individually with reference to FIG. 1. For some of the portions P, the interference patterns formed of parallel fringes have also been shown by way of illustration. Of course, similar interference patterns are present in all the portions P. Unwanted interferences with more than two waves, as well as variations of tilt of the initial wavefront $S_0$ within each zone of interest ZI, can be disregarded.

Analysis of the image that is captured by the detector 13 can start by an automatic detection of the portions P that contain the interferograms. Such an automatic detection is facilitated by the fact that the portions P are separate, i.e. with no overlap between neighbouring portions and with intermediate segments that do not receive any light flux between two neighbouring portions P. The automatic detection of the portions P is also facilitated by prior knowledge of the positions and the shapes of the portions P on the surface of the detector 13.

The individual processing of each interferogram can be carried out in many ways, in order to obtain the values for differences in piston and tilt. A method that is particularly rapid and that does not require a great deal of processing power consists of comparing each interferogram contained in a portion P to interference patterns with two plane waves that were initially stored, and for which the values for the differences in piston and tilt are known. Such a method thus proceeds by comparison of the content of images, and is very effective for images that are formed of parallel fringes. Such a method is also robust with respect to the possible presence of artefacts in the images, such as unwanted interferences with more than two waves, variations of the tilt within each zone of interest, and the effects of unwanted diffraction. In a known manner, image comparison methods often comprise an initial step during which the mean values and the standard deviations of the illumination of the images are set to identical values for the two images that are being compared. To this end, an affine scale transformation can be applied to the illumination values of at least one of the two images that are compared. Then a coincidence score is calculated for the two images. A library of interference patterns with two waves is then initially supplied, which is indexed by values for the difference in piston and the difference in tilt, and also possibly by an angular orientation value for the difference in tilt. Such interference patterns stored beforehand have been called reference patterns in the general description of the invention. For each interferogram of the complete image that is captured by the detector 13, the values for the differences in piston and tilt, and optionally also the angular orientation of the difference in tilt, are thus those of the reference pattern contained in the library for which the coincidence score is the highest. Alternatively, the angular orientation of the difference in tilt can be deduced from the comparison of each interferogram with each reference pattern when a variable rotation is applied to the interferogram or the reference pattern.

Figure 3:
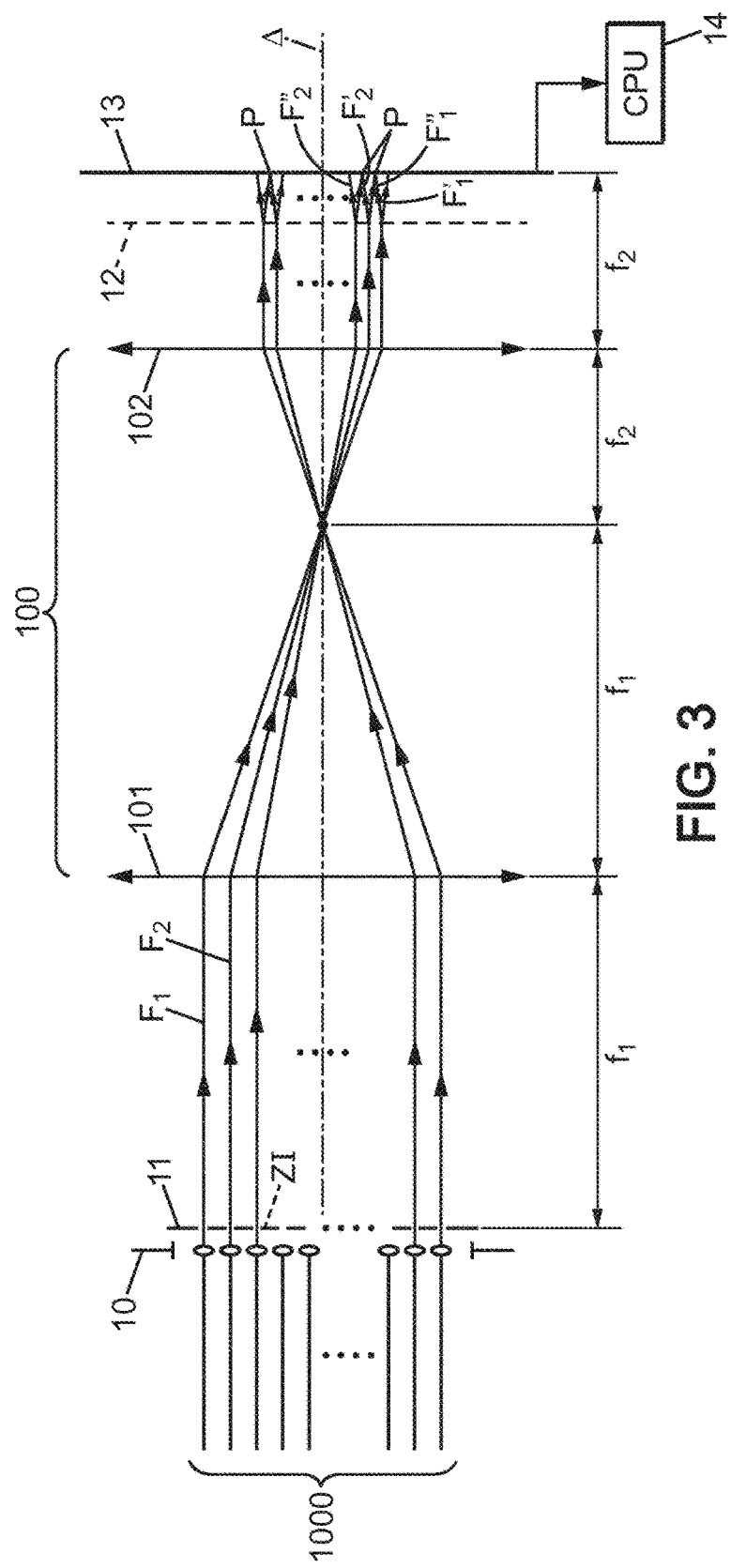
FIG. 3 is an optical diagram of a wavefront sensor according to the invention, which is used for phase adjustment of the light beams produced by several laser sources.

FIG. 3 shows a use of a wavefront sensor according to the invention, for realizing a coherent combination of light beams that are produced by a set fibre laser sources 1000. The laser sources 1000 are capable of causing interference with one another, and are arranged in parallel so that the output sections of the optical fibres are substantially all arranged in one and the same plane perpendicular to the optical axis Δ. Each optical fibre is equipped with an output lens, so that the light beam that originates from this optical fibre is collimated. The number of optical fibres that thus produce individual laser beams is unlimited, and can be for example of the order of several hundred thousand. All the individual beams of the laser sources 1000 are brought into the optical output 10, substantially parallel to the optical axis Δ. The mask 11 has at least as many openings as the number of laser sources 1000. A single optical fibre is thus directed into an opening of the mask 11 that is dedicated thereto, and it is advantageous to use neighbouring, grouped openings as far as possible. The transverse distribution of the optical fibres can be in a hexagonal network, so that a mask 11 and a grating 12 as described with reference to FIGS. 2a and 2b can be used. Thus, the laser beams that originate from the optical fibres correspond individually to the light beams $F_1, \ldots, F_4, \ldots$ that have previously been introduced. References 101 and 102 denote two converging lenses, with their focal lengths marked $f_1$ and $f_2$ respectively. They are arranged in order to form together an afocal optical system that is denoted by the reference 100. In other words, the image focal point of the lens 101 is superimposed on the primary focal point of the lens 102. The two lenses 101 and 102 have sufficient transverse extensions in order to contain all the beams originating from the optical fibres. Moreover, the surface of the image detector 13 is placed along the optical axis Δ in order to be optically conjugated with the mask 11 through the two lenses 101 and 102. For example, the mask 11 can be situated at the level of the primary focal point of the lens 101, and the surface of the image detector 13 can be situated at the level of the image focal point of the lens 102. The diffraction grating 12 can be inserted between the lens 102 and the surface of the image detector 13. Its exact position along the optical axis Δ is adjusted so that the portions P of the detector 13 are each the superimposition of the images of two neighbouring openings of the mask 11. In such a configuration of the wavefront sensor, the portions P form a hexagonal network with voids, the voids of which correspond one-to-one with the locations where the images of the openings in the mask 11 would be in the absence of the grating 12. FIGS. 2a and 2b show such a correspondence. Such an implementation of the wavefront sensor according to the invention thus makes it possible to determine the differences in piston and the differences in inclination that are present between neighbouring optical fibres, when all the fibre laser sources 1000 are monochromatic with one and the same common wavelength.

Moreover, the magnification of the afocal optical system 100 makes it possible to adjust the sensitivity of the wavefront sensor with respect to the differences in tilt, without modifying its sensitivity to the differences in piston. This variation in the sensitivity to the differences in tilt results from the Gouy theorem. The choice of a low value for the magnification of the afocal optical system 100, in particular an magnification value less than one, makes it possible to obtain a wavefront sensor that is more suitable for accurately measuring differences in tilt.

A particular case of the implementation of FIG. 3 is that in which the laser sources 1000 are of the pulsed type, each for delivering a very short radiation pulse, for example of the order of a picosecond or less. It is assumed that the differences in tilt that may exist between pulses that originate from different laser sources have been compensated for or corrected elsewhere. Due to the fact that the interfringe spacing is independent of the wavelength for an implementation that uses a diffraction grating, each interference pattern within one of the portions P of the detector 13 is still formed from fringes that are separated according to a defined interfringe spacing. For each wavelength of analysis, the residual piston difference can be deduced from the lateral shift of the central fringe of the corresponding interference pattern. However, the purpose of such an application of the invention to a pulsed regime is in fact to find the absolute differences in piston that exist between the pulses that originate from different sources, measured in the common direction of propagation of the pulses. For two pulses that originate from neighbouring sources, the absolute piston difference that exists between the latter is equal to the residual piston difference determined for each wavelength that is used for the detection, plus an integer times this detection wavelength. Such indeterminacy can be resolved by measuring the piston difference simultaneously for at least two different wavelengths. Absolute piston differences can thus be determined between two pulses originating from neighbouring laser sources, which are greater, the closer together are the wavelengths that are used to form the interference patterns. The use of two spectral intervals that are very narrow around two different wavelengths is sufficient in most cases.

Such measurements at several wavelengths can be obtained by appropriate spectral filtering, in order to select components of the radiation that correspond to different spectral intervals, and by directing each filtered component of the radiation to a separate path of the wavefront sensor. An alternative method can consist of spreading each pulse over an extended duration, by creating time-shifts that vary as a function of the frequency of the spectral components that constitute the pulse. Such spectro-temporal spreading methods are known to a person skilled in the art. Wavefront analyses according to the invention can then be carried out at different wavelengths, when they are realized at different moments within the extended duration of the spread pulse. To this end, several separate wavefront sensor paths can still be provided in parallel, and activated at different moments.

Figure 4A:
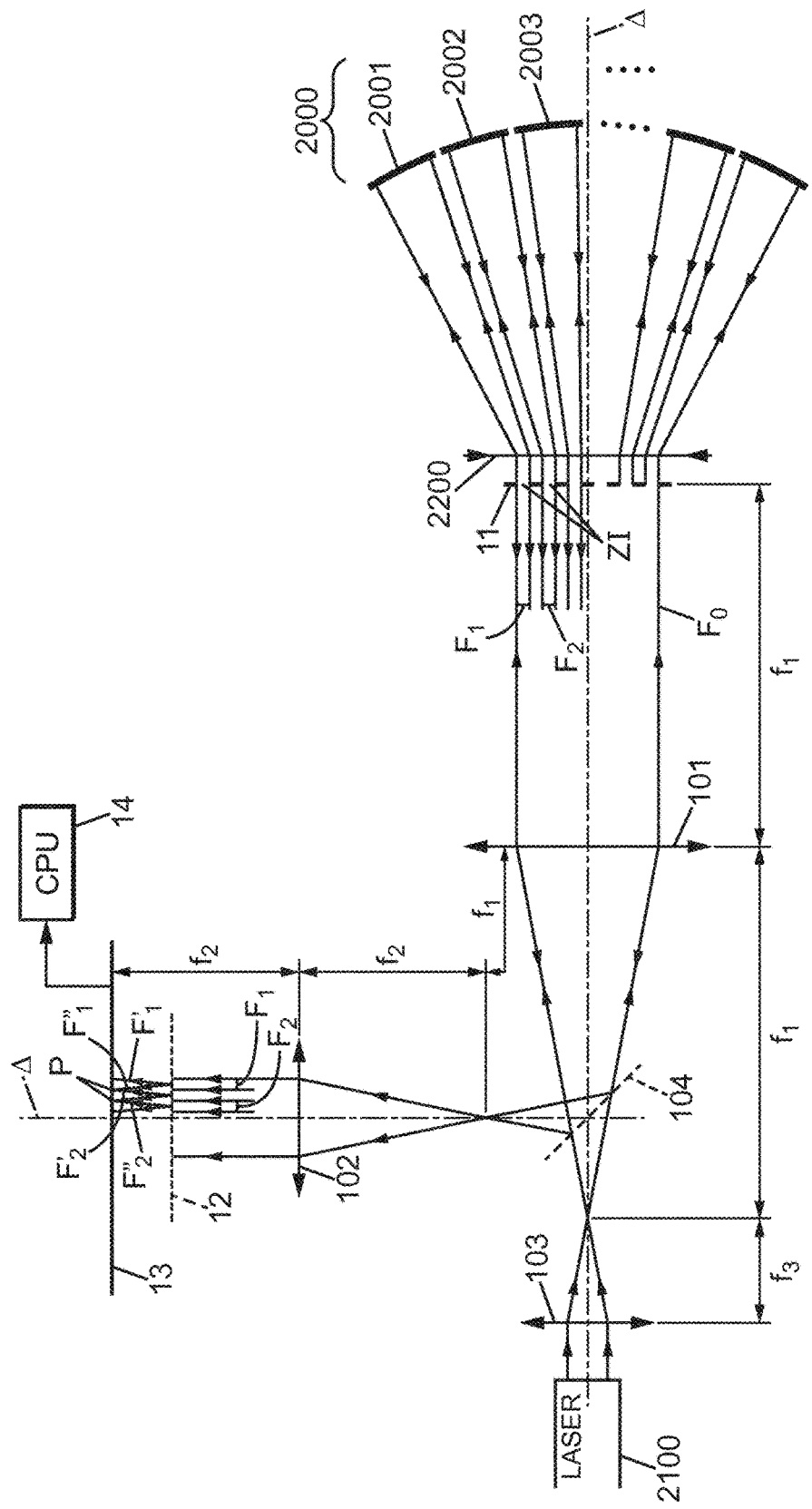
FIGS. 4a and 4b are respective optical diagrams of two further wavefront sensors according to the invention, which are used for adjusting mirror segments of a telescope of the Keck type.
Figure 4B:
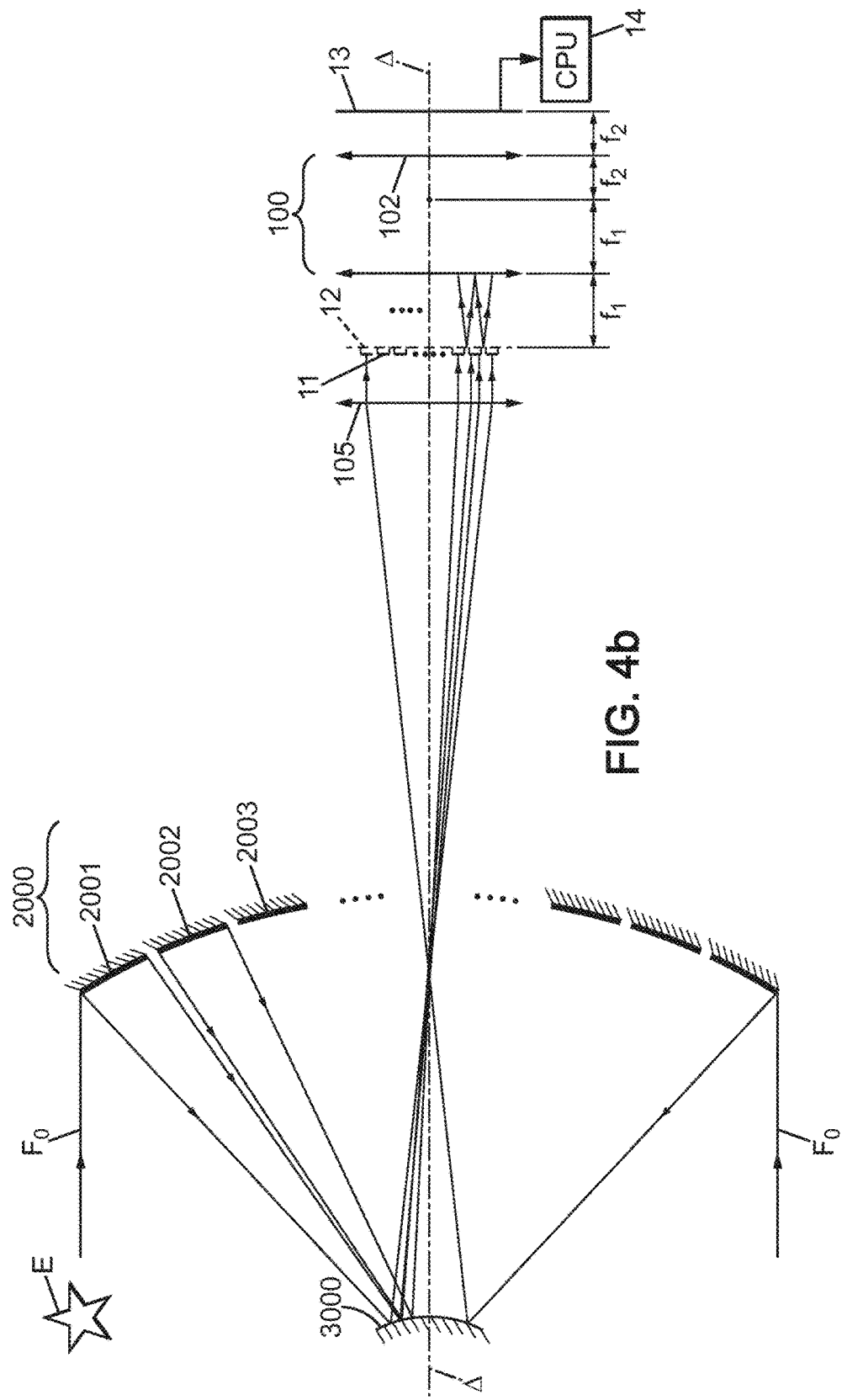

FIGS. 4a and 4b show another use of a wavefront sensor according to the invention, for measuring differences in height and inclination that can exist between neighbouring segments of a mirror of a telescope of the Keck type. Depending on the differences that will be measured in this way, the relative positions of the segments of the mirror could be readjusted, so that a wavefront produced by reflection on the entire mirror is without steps or sudden changes in the slope.

In FIG. 4a, the references 101 and 102 further denote two converging lenses that form a first afocal optical system. Simultaneously, the lens 101 forms a second afocal optical system with a converging illumination lens 103, the focal length of which is marked $f_3$. A beam splitter 104 makes it possible to couple an illumination path and an output path, with one and the same optical test path. The illumination path comprises a laser source 2100 and the lens 103. The light beam $F_0$ that is produced by the source 2100 is directed into the optical test path through the beam splitter 104. The optical test path comprises the lens 101, the mask 11, a diverging lens 2200, and the test mirror that is denoted by the reference 2000. The mirror 2000 is constituted by all the juxtaposed mirror segments 2001, 2002, 2003, etc. These mirror segments are juxtaposed in a hexagonal network, in order to use a mask and a diffraction grating such as described above. The diverging lens 2200 is selected and placed with respect to the mirror 2000 so as to produce in combination therewith an optical function equivalent to a plane mirror, when any defects in the relative positions of the individual segments 2001, 2002, 2003, etc. are not taken into account. The purpose of the present application of the invention consists of determining these defects in the relative positions. Depending on the mirror 2000, the diverging lens 2200 can be partially cylindrical. The output path comprises the lens 102, the diffraction grating 12 and the image detector 13.

In the wavefront sensor in FIG. 4a, the mask 11 is situated between the lens 101 and the lens 2200. It is designed in order to have openings that select light beams $F_1$, $F_2$, etc. originating from the respective central mirror zones 2001, 2002, 2003, etc. and in order to block parts of the light beam $F_0$ that would illuminate separation gaps present between neighbouring segments of the mirror 2000. In fact, for such a realization of the wavefront sensor, it can be considered that the optical input 10 is situated at the level of the mask 11, for the parts of the beam $F_0$ that are reflected by all the segments of the mirror, and which propagate from right to left in FIG. 4a. The optical test path and the output path then together constitute a wavefront sensor assembly that is similar to that shown in FIG. 3.

Measurement of the interfringe spacing for the interferogram that is contained in each portion P of the detector 13, provides the difference in tilt between the corresponding light beams $F_1$, $F_2$, etc. and then provides the difference in inclination that exists between the corresponding mirror segments 2001, 2002, etc., by neighbouring pairs of mirror segments. When the source 2100 is monochromatic, the position of the central fringe of each interferogram makes it possible to determine the residual piston difference that exists between the light beams reflected by two neighbouring mirror segments. The use of at least two different wavelengths also makes it possible to obtain absolute differences in piston, and then to determine the differences in height that exist between all the segments of the mirror 2000, by pairs of neighbouring mirror segments.

The diagram in FIG. 4b is a variant of that in FIG. 4a, for obtaining an application of the invention that can be implemented on the installation site of a telescope of the Keck type. The reference 2000 denotes the primary mirror of the telescope of the Keck type, with the mirror segments 2001, 2002, 2003, etc. The reference 3000 denotes the secondary mirror of the telescope, in the case taken by way of example of a telescope with two mirrors. The lens 105 has a collimation function, and forms the optical input of the wavefront sensor. In this variant of the wavefront sensor, the mask 11 and the diffraction grating 12 can be side by side, and optically conjugated with the image detector 13 through the afocal system 100. They are also optically conjugated with the mirror 2000. The radiation that is used for characterizing the differences in height and inclination of the mirror segments 2001, 2002, 2003, etc. can then be directly the light beam $F_0$ that originates from a star E and reaches the primary mirror 2000. The mask 11 is further designed to block portions of the beam $F_0$ that reach the level of the primary mirror 2000 in the intermediate gaps between neighbouring mirror segments, and in the peripheral parts of the mirror segments.

It is understood that the present invention can be reproduced while modifying numerous details of realization with respect to the above description, while still retaining at least some of the aforementioned advantages. Among the possible modifications, the following are mentioned non-limitatively:

- the radiation splitter may be constituted by mirrors instead of the diffraction grating;
- the distribution network of the zones of interest that is defined by the mask may be square or other, instead of hexagonal. The pattern of the diffraction grating can be adapted accordingly;
- by optical equivalence, the order of the optical components that constitute the wavefront sensor may be modified. In particular the mask, the grating and the afocal optical system may be arranged in different orders while following a direction of propagation of the radiation within the wavefront sensor;
- the afocal optical system may have a different structure to that with two converging lenses which has been described;
- by depth of field effect, the mask may be offset to a large extent along the optical axis of the wavefront sensor, while retaining an effect that remains almost identical in the image that is captured; and
- a wavefront sensor that is according to the invention can be used for numerous applications, other than those which have been described.

The invention claimed is:

1. A wavefront sensor based on interference, comprising:
an optical input (10) that receives a light radiation having an initial wavefront ($S_0$) that extends through said optical input;
a radiation splitter, configured to produce, from light beams ($F_1$, $F_2$) that originate respectively from restricted zones within the optical input (10), at least two sub-beams ($F'_1$, $F''_1$, $F'_2$, $F''_2$) for each light beam, each sub-beam reproducing characteristics of the initial wavefront ($S_0$) existing in the corresponding restricted zone;
optical paths, configured to superimpose two sub-beams ($F''_1$, $F'_2$) that originate respectively from two different restricted zones within the optical input (10), and which each pass via a different optical path;
at least one image detector (13), configured to capture interference patterns that are produced by the superimposed sub-beams ($F''_1$, $F'_2$);
a processing module (14) that determines, from the interference patterns, differences in piston (p) and tilt (i) existing for the initial wavefront ($S_0$) between the restricted zones from which the superimposed sub-beams originate; and
a mask (11) that selects, by means of openings in said mask, disjoint zones of interest (ZI) within the optical input (10) as restricted zones, by at least partially blocking the initial wavefront ($S_0$) outside said zones of interest, or by at least partially blocking light beams that do not originate from said zones of interest, so that separate portions (P) of the image detector (13) are dedicated respectively to pairs of zones of interest that are neighbouring within the optical input.

2. The wavefront sensor according to claim 1, in which the radiation splitter comprises a diffraction grating (12).

3. The wavefront sensor according to claim 2, wherein the sub-beams ($F'_1$, $F''_1$, $F'_2$, $F''_2$) that are produced by the diffraction grating (12) for each beam ($F_1$, $F_2$) correspond to the values +1 and −1 for one or more diffraction order numbers.

4. The wavefront sensor according to claim 2, wherein the mask (11) and the image detector (13) are optically conjugated.

5. The wavefront sensor according to claim 2, further comprising:
an afocal optical system (100) arranged on a radiation path between the optical input (10) and the image detector (13), so as to transform the initial wavefront (S0), with respect to the interference patterns that are captured by the image detector, by an homothetic spatial effective scaling within the optical input.

6. The wavefront sensor according to claim 3, wherein the mask (11) and the image detector (13) are optically conjugated.

7. The wavefront sensor according to claim 3, further comprising:
an afocal optical system (100) arranged on a radiation path between the optical input (10) and the image detector (13), so as to transform the initial wavefront ($S_0$), with respect to the interference patterns that are captured by the image detector, by an homothetic spatial effective scaling within the optical input.

8. The wavefront sensor according to claim 1, wherein the mask (11) and the image detector (13) are optically conjugated.

9. The wavefront sensor according to claim 8, further comprising:
an afocal optical system (100) arranged on a radiation path between the optical input (10) and the image detector (13), that transforms the initial wavefront ($S_0$), with respect to the interference patterns that are captured by the image detector, by an homothetic spatial effective scaling within the optical input.

10. The wavefront sensor according to claim 9,
wherein the optical input (10), the mask (11), the afocal optical system (100), the radiation splitter, and the image detector (13) are arranged in this order, following a direction of propagation of the radiation within the wavefront sensor, and
wherein the mask and the image detector are optically conjugated by the afocal optical system through the radiation splitter.

11. The wavefront sensor according to claim 1, wherein the mask (11) and the radiation splitter are formed together by a spatial light modulator.

12. The wavefront sensor according to claim 1,
wherein the mask (11) selects the zones of interest (ZI) according to a hexagonal distribution network of said zones of interest within the optical input (10), and
wherein the diffraction grating (12) is two-dimensional with a hexagonal pattern, and oriented so that axes of symmetry of the diffraction grating are at 90° to axes of symmetry of the mask, about an optical axis (A) of the wavefront sensor.

13. The wavefront sensor according to claim 1, wherein the mask (11) is such that any two neighbouring zones of interest (ZI) have one same shape and one same size, and are separated by a blocking zone of said mask that is situated between said two neighbouring zones of interest, said blocking zone being large enough to contain a shape that is identical to that of each of the two neighbouring zones of interest, and that is the same size as said two neighbouring zones of interest.

14. The wavefront sensor according to claim 1,
wherein the processing module (14) comprises a library of stored reference patterns, which are each constituted by parallel rectilinear interference fringes, each reference pattern being associated with a value for the piston difference and a value for the tilt difference, and
wherein values for the difference in piston and tilt existing between two neighbouring zones of interest (ZI) are deduced by searching for a maximum coincidence between the interference pattern corresponding to said two zones of interest, and one of the stored reference patterns.

15. The wavefront sensor according to claim 1,
wherein the processing module (14) determines a value for the piston difference (p) existing between two neighbouring zones of interest (ZI), from a transverse fringe shift existing in the interference pattern corresponding to said two zones of interest, and
wherein the processing module (14) also determines a value for the difference in tilt (i) existing between two neighbouring zones of interest (ZI), from an interfringe spacing existing in said interference pattern corresponding to the two zones of interest.

16. The wavefront sensor according to claim 1, further comprising:
a spectral separation system, configured to separate from one another at least two spectral components of the light radiation received by the optical input (10),
wherein the wavefront sensor captures separately, for each spectral component, the interference patterns that are produced by the superimposed sub-beams ($F''_1$, $F'_2$), and determines the differences in piston (p) and tilt (i) for each spectral component, from interference patterns captured for said spectral component.

17. A method for determining differences in piston (p) and tilt (i) between individual wavefronts of light beams ($F_1$, $F_2$) capable of producing interferences, comprising the following steps:
supplying a wavefront sensor based on interference according to claim 1;
directing each light beam ($F_1$, $F_2$) onto a different zone of interest (ZI), using zones of interest that are neighbouring in the optical input (10) of the wavefront sensor; and
activating the image detector (13) and the processing module (14) in order to determine the differences in piston (p) and tilt (i) that exist between the individual wavefronts the light beams ($F_1$, $F_2$) of which were directed onto neighbouring zones of interest (ZI).

18. The method according to claim 17,
wherein the light beams ($F_1$, $F_2$) are produced by a radiation source (2100) arranged so that said radiation is reflected simultaneously by the juxtaposed segments (2001, 2002) of a mirror (2000), and for each segment (2001, 2002) of the mirror, a part of the radiation that is reflected by said mirror segment forms the light beam ($F_1$, $F_2$) that is directed to one of the zones of interest (ZI) of the optical input (10), and wherein the method further comprises:

calculating height differences and inclination differences that exist between two neighbouring segments (2001, 2002) of the mirror, from values for the differences in piston (p) and tilt (i) that are determined for the corresponding light beams.

19. The method according to claim 17, wherein the light beams ($F_1$, $F_2$) are produced respectively by separate fibre laser sources (1000).

20. The method according to claim 19, wherein the laser sources (1000) are of pulsed laser type where the radiation splitter of the wavefront sensor comprises a diffraction grating, and wherein the method further comprises:

calculating time differences and direction-of-propagation differences that exist between pulses of radiation that are produced by two different laser sources, the beams ($F_1$, $F_2$) of which were directed onto two neighbouring zones of interest (ZI), from values for the differences in piston (p) and tilt (i) that are determined for said beams.

* * * * *